Aug. 9, 1966

M. J. WOZNICK 3,264,773

SIGNALING FISH POLE HOLDER

Filed July 21, 1964

INVENTOR.
MIKE J. WOZNICK

BY Eugene M. Eckelman
ATTORNEY ically to the drawings, the present signaling pole holder comprises a housing 10 which in a preferred construction is of channel shape having a top wall 12 and side walls 14. The bottom and ends of the housing 10 are open.

Figure 1:
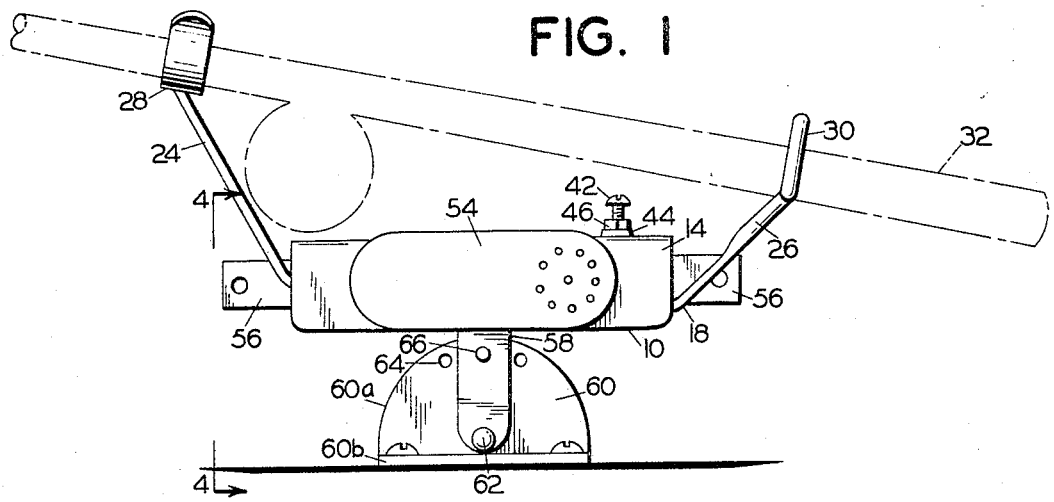

A laterally extending pin or shaft 16 is pivotally supported in the side walls 14 of the housing, and integrated with this pin or shaft is a pole holder 18. The said holder comprises a lever having upwardly angled sections 20 and 22 leading outwardly from the pin 16 and terminating at their ends in upwardly angled extensions 24 and 26, respectively. Extension 24 terminates at its upper end in a cradle member 28 and extension 26 terminates in a hook 30 the opening of which is to one side and at the bottom. The cradle 28 and hook 30 are disposed in a plane above the housing 10 and are adapted to support a fish pole 32 as shown in broken lines in FIGURE 1. My means of the front, top opening cradle 28 and the rear, downwardly opening hook 30, a pole is securely supported in the holder and at the same time is readily removed by raising the forward end thereof and then shifting the rearward end to clear the pole from the cradle 28 and the hook 30.

Figure 3:
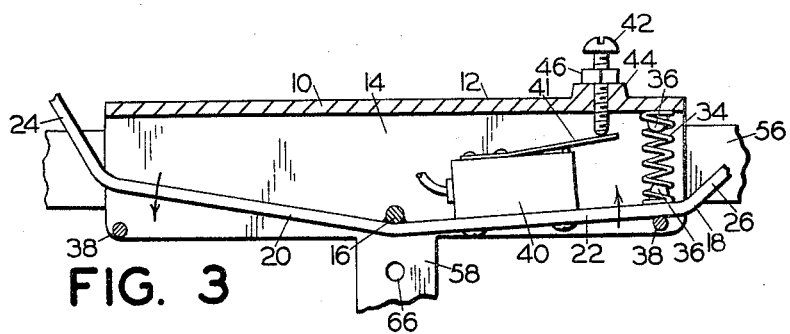
Figure 4:
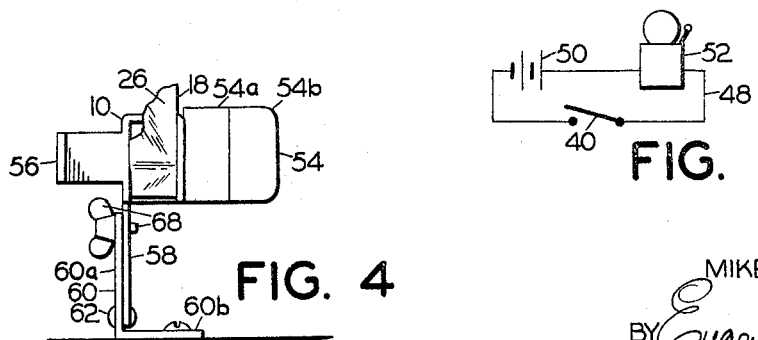

The pole holder 18 is urged in a clockwise direction, FIGURE 3, by a compression spring 34 disposed within the housing adjacent the rear thereof and confined between the lower surface of top wall 12 of said housing and the upper surface of holder 18. For maintaining the spring 34 in place, projections 36 are secured to the housing and to the lever 18 and extend into the ends of the spring.

It is apparent that when a fish is on the line the tip of the pole will be pulled down. This urges the lever 18 in a counterclockwise direction, FIGURE 3, and if the pull is sufficiently great to overcome the spring 34 the lever will rotate relative to the housing. Preferably stop pins 38 are secured laterally between the walls 38 at each end of housing 10 adjacent the lower end thereof to limit pivotal movement of the lever 18 in both directions.

Mounted on the lever section 22 is a switch 40 having a projecting switch arm 41. This switch arm is adapted for engagement wtih the bottom end of a stop screw 42 threadedly mounted in a boss in the top wall 12 of the housing. Stop screw 42 is not in circuit with the switch 40 but merely serves as a switch closing stop when the switch is rotated with the lever 18 into a certain position of abutment with the stop screw. A locknut 46 is carried on the screw for anchoring it in selected positions of adjustment.

Figure 5:
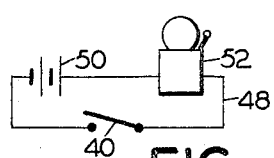

Switch 40 is in a circuit 48, FIGURE 5, with a source of potential 50, such as a dry cell, and signaling means 52, such as a bell or buzzer. The source of potential 50 and signal 52 preferably are enclosed in a casing 54 secured to one side wall of the housing 10. This casing is formed in two parts 54a and 54b which may be separated one from the other for gaining access to its interior.

Figure 2:
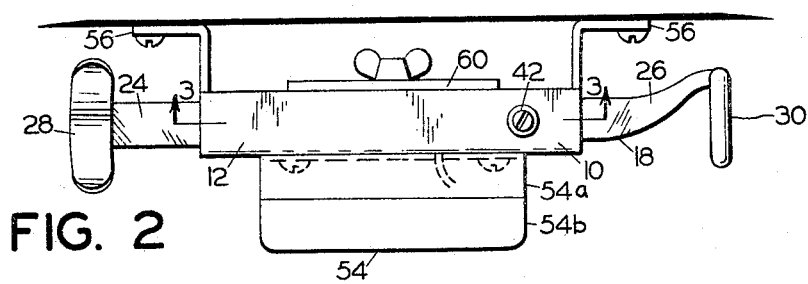

Projecting laterally from one of the side walls 14 of the housing are right angle brackets 56, best seen in FIGURE 2, which serve to secure the present holder to a vertical surface such as the side wall of a boat. Projecting downwardly in integral relation from one of the side walls 14 of the housing is a bracket arm 58 pivotally supporting a mounting plate 60 by means of a pivot pin 62, the mounting plate being right angular in construction, having a vertical portion 60a and a horizontal portion 60b. Portion 60a is disposed in face to face relation with bracket arm 58. The pivot connection is adjacent the lower end of the bracket arm 58 and the mounting plate 60 has a series of arcuately disposed apertures 64 adjacent the upper end thereof. Arm 58 has an aperture 66 disposed for alignment with either one of the holes 64 upon relative pivotal movement of the bracket arm 58 and the mounting plate 60, and upon a selected alignment of holes, a pin 68 is inserted therethrough. Pin 68 preferably comprises a screw having a turning knob 68 and being threadedly engageable with one or the other of the holes in the arm 58 or mounting plate 60.

Thus, the housing 10 may be mounted at selected angles relative to the mounting plate 60. The latter mounting plate is intended to mount the holder on a horizontal surface such as on any flat surface of a boat, dock, or the like.

In operation of the present device, the holder is mounted in a fixed position on a boat or dock by a suitable one of the mounting means 56 or 60. In the event that the holder is mounted on a horizontal surface by means of the mounting plate 60 it is positioned at a selected angle by the alignment of a selected hole 64 with the hole 66 and a pin 68 inserted in place. The spring 34 is of selected strength such that it will hold the lever in a non-signaling position even though a substantial tug may exist on the fish line such as from the dragging resistance of a weight and bait. The stop screw 42 may be selectively adjusted with relation to the housing to cause operation of the circuit upon a selected degree of rotation of the lever. That is, if for example a heavy weight is being used on the line the stop screw 42 may be backed-off a sufficient amount to permit an extra few degrees of rotation of the lever 18 without actuating the signal means. On the other hand, if a lighter weight is being utilized the screw may be set further inwardly. At any rate, when a fish takes the hook the lever 18 is rotated sufficiently to bring switch arm 41 into engagement with the bottom end of the screw 42 to sound the signal.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A fish pole holder comprising a housing, means on said housing for mounting it in a stationary position, a lever pivotally mounted in said housing and having end extensions projecting upwardly through the ends of said housing to a plane above said housing, pole holding means on the ends of said extensions whereby said lever is rotated relative to said housing when a fish exerts a tug on a pole in said holding means, resilient means resisting rotation of said lever, an electric circuit, switch means mounted on one of said housing and lever and arranged in said circuit, switch operating means mounted on the other of said housing and lever in spaced relation from said switch means and arranged to engage the latter and energize the circuit upon a selected rotation of said lever, and signal means in said circuit energized upon engagement of said switch means and said switch operating means as a result of rotation of said lever by a fish.

2. The fish pole holder of claim 1 wherein said signal means is mounted on said housing.

3. The fish pole holder of claim 1 wherein said means for mounting the housing in a stationary position comprises a downwardly projecting arm integrated with the housing, a mounting plate pivotally attached to said arm, means on said plate for securing it to a mounting structure, and releasable attaching means connected between said arm and said mounting plate to vary angular disposition thereof, thus positioning said housing at selected angles relative to a mounting structure.

4. The fish pole holder of claim 3 including mounting bracket means on said housing projecting at right angles from said arm whereby said housing may be attached to either a horizontal or vertical surface by respective use of said mounting plate or said mounting bracket means.

References Cited by the Examiner
UNITED STATES PATENTS

| 2,745,088 | 5/1956 | Bauer | 43—17 X |
| 2,996,824 | 8/1961 | Faycosh | 43—16 |
| 3,041,769 | 7/1962 | Bray et al. | 43—17 |

ABRAHAM G. STONE, *Primary Examiner.*

S. KOREN, *Examiner.*

R. L. HOLLISTER, *Assistant Examiner.*